United States Patent
Hood et al.

(10) Patent No.: US 6,722,657 B2
(45) Date of Patent: Apr. 20, 2004

(54) LOW TORQUE SEAL ASSEMBLY WITH OPEN CELL FILTER MEDIA

(75) Inventors: Charles Robin Hood, Bullard, TX (US); Donald G. Wells, Longview, TX (US); Mark N. Gold, Hallsville, TX (US); Richard Borowski, Canton, OH (US)

(73) Assignees: Stemco LLC, Charlotte, NC (US); The Timken Company, Canton, OH (US)

( * ) Notice: Subject to any disclaimer, the term of this patent is extended or adjusted under 35 U.S.C. 154(b) by 0 days.

(21) Appl. No.: 10/159,991

(22) Filed: May 31, 2002

(65) Prior Publication Data

US 2003/0222405 A1 Dec. 4, 2003

(51) Int. Cl.$^7$ .............................. F16J 15/16; F16J 15/40; F16C 33/74; F16C 33/76
(52) U.S. Cl. ...................... 277/345; 277/350; 277/409; 277/411; 384/133; 384/478
(58) Field of Search ................. 277/409, 410, 277/411, 412, 418, 419, 420, 421, 423, 345, 346, 350; 384/133, 144, 446, 478, 480

(56) References Cited

U.S. PATENT DOCUMENTS

| | | | |
|---|---|---|---|
| 3,628,837 A | * 12/1971 | Otto | ............................ 384/462 |
| 4,139,203 A | * 2/1979 | Garrison | ....................... 277/348 |
| 4,373,759 A | * 2/1983 | Greener et al. | .............. 384/480 |
| 4,383,720 A | 5/1983 | Ernst | |
| 4,504,067 A | 3/1985 | Cather, Jr. | |
| 4,552,367 A | 11/1985 | Fedorovich et al. | |
| 4,721,314 A | 1/1988 | Kanayama et al. | |
| 4,739,998 A | 4/1988 | Steusloff et al. | |
| 4,770,548 A | 9/1988 | Otto | |
| 4,783,086 A | 11/1988 | Bras et al. | |
| 4,819,949 A | 4/1989 | Otto | |
| 4,844,480 A | 7/1989 | Gralka | |
| 4,848,776 A | * 7/1989 | Winckler | ...................... 277/349 |
| 4,943,068 A | * 7/1990 | Hatch et al. | ................. 277/353 |
| 5,004,248 A | 4/1991 | Messenger et al. | |
| 5,015,001 A | 5/1991 | Jay | |
| 5,024,364 A | 6/1991 | Nash | |
| 5,028,054 A | * 7/1991 | Peach | .......................... 277/348 |
| 5,056,799 A | 10/1991 | Takenaka et al. | |
| 5,129,744 A | * 7/1992 | Otto et al. | ................... 384/486 |
| 5,139,275 A | 8/1992 | Ehrmann et al. | |
| 5,190,299 A | 3/1993 | Johnston | |
| 5,195,757 A | 3/1993 | Dahll, V | |
| 5,209,449 A | 5/1993 | Hart | |
| 5,427,387 A | 6/1995 | Johnston | |
| 5,577,741 A | 11/1996 | Sink | |
| 5,615,894 A | 4/1997 | vom Schemm | |
| 5,997,005 A | 12/1999 | Gold et al. | |
| 6,015,153 A | 1/2000 | Sharrer | |
| 6,158,743 A | 12/2000 | Anderson et al. | |
| 6,170,833 B1 | 1/2001 | Cox et al. | |
| 6,257,587 B1 | * 7/2001 | Toth et al. | ................... 277/309 |

* cited by examiner

*Primary Examiner*—Anthony Knight
*Assistant Examiner*—Vishal A Patel
(74) *Attorney, Agent, or Firm*—John M. Harrington; Kilpatrick Stockton LLP

(57) ABSTRACT

Disclosed is a labyrinth seal assembly for sealing an annular gap defined between a bore of a housing and an outer surface of a cylindrical shaft, wherein the housing and shaft are relatively movable. The seal assembly includes radially inner and radially outer shield rings. The radially inner shield ring has an inner surface which is adapted and configured for support by the shaft. The radially outer shield ring is partially disposed within the sealing channel of the inner shield ring. The outer shield ring includes a casing member, foam seal elements, and a shield element retainer. The foam seal elements depend radially inward into the sealing channel so as to form a circuitous sealing labyrinth therein. The seal elements are formed preferably from polyurethane. A highly viscous fluid is disposed within the circuitous sealing labyrinth.

35 Claims, 3 Drawing Sheets

LOW TORQUE SEAL ASSEMBLY WITH OPEN CELL FILTER MEDIA

BACKGROUND OF THE INVENTION

1. Field of the Invention

The subject disclosure relates to unitized bearing seal assemblies, and more particularly to, a low torque seal assembly wherein open cell filter media is utilized to partially define a circuitous sealing labyrinth and to maintain lubricant within an interior bearing chamber and exclude contaminants therefrom.

2. Background of the Related Art

Ball and roller bearing assemblies are well known in the art and have been used for many years in applications such as railway cars, crane wheels and trucking. Bearing assemblies are typically provided as a self-contained unit and generally include a plurality of circumferentially-spaced balls or rollers confined between concentric outer and inner rings or cylinders. The concentric rings define an interior chamber for containing the rolling elements and supply smooth, hard, accurate surfaces for the balls or rollers to roll on. These surfaces are referred to as races or raceways. A uniform spacing is maintained between adjacent balls or rollers within the interior chamber by a cage or separator element and a lubricant such as grease is applied therein. The rolling elements are the most important component of the bearing assembly, because they transmit the loads from the moving parts of the machine to the stationary support. The balls are ideally uniformly spherical, but the rollers may be straight cylinders, or they may be tapered, cone-shaped or other forms depending upon the purpose of the design. Additionally, the balls or rollers can be provided in a single row or multiple rows.

Bearing assemblies are typically dimensioned and configured such that they can be installed by sliding the assembly over an axle journal and into a housing. The inner ring is typically engaged with the axle journal and the outer ring is engaged with the housing so as to enable the axle to rotate relative to the housing or vise versa. Bearing assemblies often operate in hostile environments, and this is particularly true when they are used in application such as railcars. As a result, the interior chamber which contains the rolling elements, must be sealed so that contaminants, such as dirt and water, are kept out and lubricant is kept in.

U.S. Pat. No. 4,770,548 to Otto discloses a hydrodynamic seal which is suitable for closing the end of a tapered roller bearing assembly. The seal includes a seal case which is pressed into a counterbore formed in the end of the outer ring (cup) and an elastomeric sealing element. The elastomeric sealing element has a primary lip and a secondary lip which cooperate with a sealing surface on a thrust rib on the inner ring (cone) to effect a live seal along the surface. The secondary lip is in direct contact with the sealing surface of the thrust rib with the primary lip being slightly offset therefrom.

U.S. Pat. No. 4,819,949 also to Otto discloses a seal assembly for closing the end of a tapered roller bearing. The seal assembly is a unitized assembly which includes interlocked seal and shield portions. The seal portion is a two-piece unit which consists of a rigid case and a flexible sealing element. The rigid case is mounted to the outer ring of the bearing and the flexible sealing element is bonded to the outboard end of the rigid case. The flexible sealing element has a dirt lip directed obliquely toward and contacting the shield portion, and a secondary lip also directed obliquely toward the shield portion, but it is not in contact with the shield portion.

Radial lip seals which contact the sealing surface, like those disclosed in the Otto patents, are common. Although contacting lip seals adequately perform the sealing function, the contact between the lip and the sealing surface causes seal wear and a loss of power in the rotating system due to friction between the two surfaces. In addition to the interference between the lip and the sealing surface, the elasticity of the rubber element and the spring force (if used) applied thereto creates a radial load which results in additional torque requirements and the generation of heat. Still further, while these lip seals adequately perform the sealing function, they do not provide a mechanism for exhausting the bearing chamber. More specifically, during operation of the bearing seal assembly, positive contacting lip seals do not provide for ventilation of the bearing chamber and therefore, the temperature within the bearing chamber increases and pressurized gases are created. Both of these conditions adversely impact the performance and wear of the bearing seal assembly.

There is a need therefore, for a seal assembly which excludes contaminants, such as water and dirt, from within the interior bearing chamber and retains the lubricant therein, while requiring less torque to rotate than a conventional radial lip seal and providing a mechanism for bidirectional movement of gases between the bearing chamber and seal exterior to equalize the pressure.

SUMMARY OF THE INVENTION

The subject disclosure relates to a labyrinth seal assembly for sealing an annular gap defined between a bore of a housing and an outer surface of a cylindrical shaft, wherein the housing and shaft are relatively movable. The seal assembly includes radially inner and radially outer shield rings. The radially inner shield ring has an inner surface which is adapted and configured for support by the shaft. The inner shield ring defines a sealing channel which includes at least one sealing surface.

The radially outer shield ring is partially disposed within the sealing channel of the inner shield ring. The outer shield ring includes a casing member, at least one foam seal element, and a shield element retainer. The casing member includes opposed first and second axially extending portions, the first axially extending portion adapted and configured for engagement with the housing. In a preferred configuration, the first axially extending portion is positioned axially offset from and radially outward of the second axially extending portion and the casing member further includes a radially extending shoulder portion which connects the first axially extending portion to the second axially extending portion.

The seal element retainer is engaged with the second axially extending portion of the casing member and the at least one foam seal element depends radially inward therefrom into the sealing channel so as to form a circuitous sealing labyrinth therein.

It is envisioned that the seal assembly further includes a highly viscous fluid disposed within the circuitous sealing labyrinth. In one embodiment, the highly viscous fluid is a water insoluble grease. Alternatively, the highly viscous fluid can be a ferrofluid. In this embodiment it is preferred that the at least one foam seal element include a conventional magnet.

Preferably, the at least one foam seal element is formed from polyurethane and includes first and second foam seals.

It is presently envisioned that the first foam seal has a material density which is greater than a material density for the second foam seal. More specifically, the first foam seal element has a pore size of 20 pores per inch and the second foam seal has a pore size of 45 pores per inch.

The seal element retainer is engaged with the second axially extending portion by means of a press fit. Those skilled in the art will readily appreciated that alternative mechanisms for engaging the seal element retainer with the second axially extending portion of the casing member can be used without departing from the inventive aspects of the present disclosure. In a preferred embodiment, seal element retainer includes a first baffle ring which has an arm portion that depends radially inward into the sealing channel. It is presently envisioned that the seal element retainer is formed from a plastic material and the at least one foam sealing element is adhered thereto.

The seal assembly of the present disclosure can further include a second baffle ring which has a shoulder portion and an arm portion. The shoulder portion is engaged with the inner shield ring and the arm portion depends from the shoulder portion so as to extend radially outward into the sealing channel.

The present disclosure is also directed to a bearing assembly for placement between a bore of a housing and an outer surface of an elongated axle. The bearing assembly includes an outer cylinder, an inner cylinder, a plurality of bearings, and at least one labyrinth seal assembly.

The outer cylinder has axially opposed first and second ends and defines a first race surface on an inner diameter thereof and a central axis for the bearing assembly. The inner cylinder is coaxially positioned within the outer cylinder and defines a second race surface on an outer diameter thereof, wherein a bearing chamber is defined between the outer cylinder and the inner cylinder. The plurality of bearings are disposed within the bearing chamber and are in rolling contact with the first and the second race surfaces. Each bearing facilitates the relative rotational movement between the inner cylinder and the outer cylinder.

The labyrinth seal assembly is associated with the first end of the outer cylinder and seals the bearing chamber defined between the outer cylinder and the inner cylinder. The seal assembly includes radially inner and radially outer shield rings. The radially inner shield ring has an inner surface which is adapted and configured for support by the shaft. The inner shield ring defines a sealing channel which includes at least one sealing surface.

The radially outer shield ring is partially disposed within the sealing channel of the inner shield ring. The outer shield ring includes a casing member, at least one foam seal element, and a shield element retainer. The casing member includes opposed first and second axially extending portions, the first axially extending portion adapted and configured for engagement with the housing.

As before, it is envisioned that the seal assembly further includes a highly viscous fluid disposed within the circuitous sealing labyrinth. In one embodiment, the highly viscous fluid is a water insoluble grease. Alternatively, the highly viscous fluid can be a ferrofluid. In this embodiment it is preferred that the at least one foam seal element includes a conventional magnet or electromagnet.

The present disclosure is also directed to a labyrinth seal assembly for sealing an annular gap defined between a bore of a housing and an outer surface of an elongated axle, wherein relative rotational movement exists between the axle and the housing. The seal assembly includes radially inner and outer shield rings. The radially inner shield ring has an inner surface adapted and configured for support by the axle. The inner shield ring defines a sealing channel which includes at least one sealing surface.

The radially outer shield ring includes a casing member, a first baffle ring, and first and second foam seal elements. The casing member has axially opposed first and second end portions. The first end portion is adapted and configured for engagement with the bore of the housing and the second end portion is partially disposed within the sealing channel so as to form a first section of a circuitous sealing labyrinth. In a representative embodiment the first axially extending portion is positioned axially offset and radially outward of the second axially extending portion and the casing member further includes a radially extending shoulder portion which connects the first axially extending portion to the second axially extending portion.

The first baffle ring has a shoulder portion and an arm portion. The shoulder portion is engaged with the second end portion of the casing member. The arm portion depends radially inward from the shoulder portion into the sealing channel.

The first and second foam seal elements are disposed within the sealing channel so as to form a second portion of the circuitous sealing labyrinth. The first foam seal element is engaged with the first baffle ring and the second foam seal element is affixed to the second end portion of the casing member.

Preferably, the first foam seal has a material density which is greater than a material density for the second foam seal. In a representative embodiment, the first foam seal element has a pore size of 20 pores per inch and the second foam seal has a pore size of 45 pores per inch. It is envisioned that the foam seal elements are formed from polyurethane.

The first baffle ring is engaged with the second axially extending portion by means of a press fit. Alternative mechanisms of engaging the baffle ring with the second axially extending portion of the casing member can be used without departing from the inventive features and methods disclosed herein. Preferably, the first baffle ring is formed from a plastic material.

In a alternate embodiment, the seal assembly further includes a second baffle ring which has a shoulder portion and an arm portion. The shoulder portion is engaged with the inner shield ring and the arm portion depends from the shoulder portion so as to extend radially outward into the sealing channel.

Those skilled in the art will readily appreciate that the seal assembly of the subject disclosure excludes contaminants from within the bearing chamber and prevents lubricant from escaping therefrom while requiring less torque to rotate, thereby reducing power losses in the rotating system. Additionally, the open celled foam elements allow air to migrate between the bearings and the environment, while blocking contaminants such as dirt and water. These and other unique features of the unitized seal assembly disclosed herein will become more readily apparent from the following description, the accompanying drawings and the appended claims.

BRIEF DESCRIPTION OF THE DRAWINGS

So that those having ordinary skill in the art to which the subject disclosure appertains will more readily understand how to make and use the same, reference may be had to the drawings wherein.

These and other features of the subject disclosure will become more readily apparent to those having ordinary skill in the art from the following detailed description of preferred embodiments.

DETAILED DESCRIPTION OF THE PREFERRED EMBODIMENTS

Figure 1:
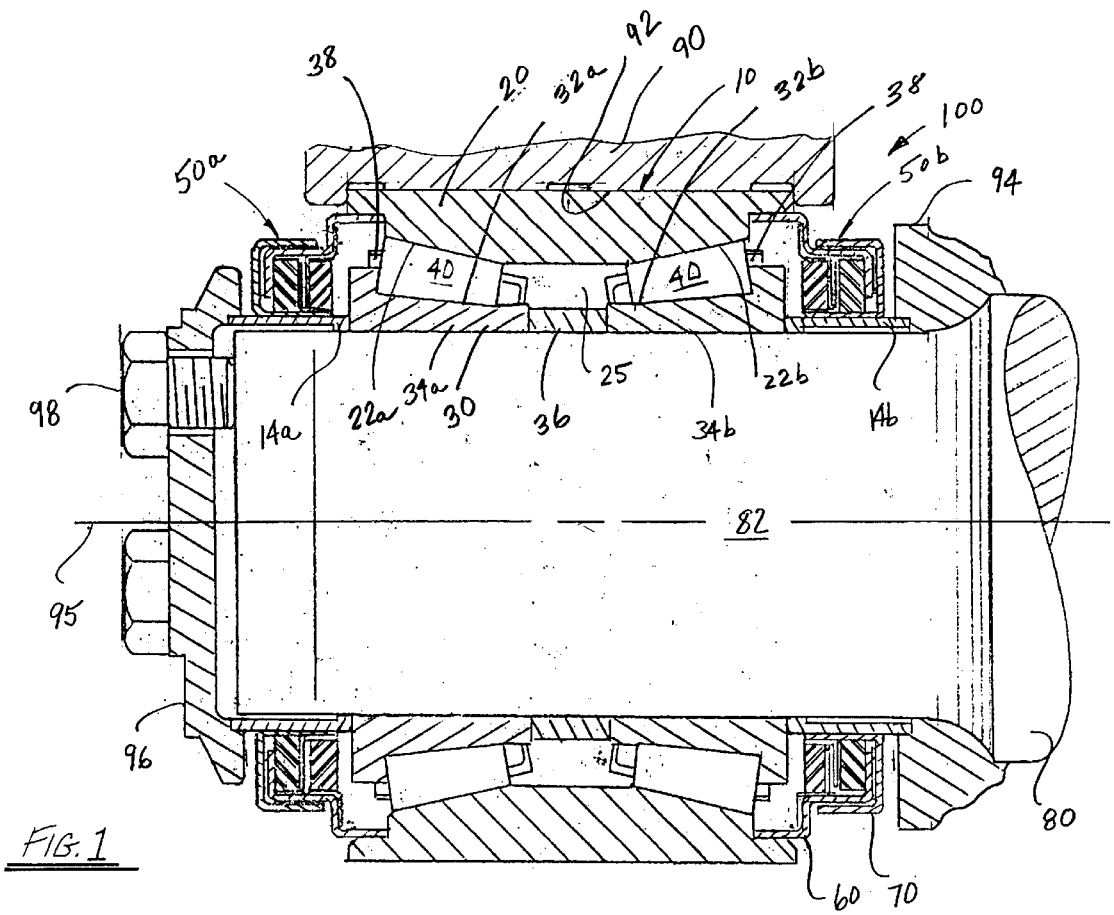
FIG. 1 is a cross-sectional view of an installed unitized bearing assembly which is constructed in accordance with a preferred embodiment of the subject application, the bearing assembly including a double row tapered roller bearing and first and second axially opposed unitized seals.

Referring now to the drawings wherein like reference numerals identify similar elements of the subject invention, there is illustrated in FIG. 1 a unitized bearing seal assembly constructed in accordance with a preferred embodiment of the subject disclosure and designated generally by reference numeral 100. Bearing seal assembly 100 includes bearing component 10 and axially opposed first and second interlocking seal assemblies 50a and 50b.

Bearing component 10 is a two row tapered roller bearing which includes an outer ring or double cup 20, an inner ring 30, and a plurality of circumferencially-spaced apart tapered rollers 40 disposed within an interior chamber 25 defined between the cup 20 and the inner ring 30. Angled surfaces 22a and 22b are formed on the interior portion of cup 20 and are oriented so as to correspond with the taper angle of rollers 40. Similarly, inner ring 30 includes angled surfaces 32a and 32b which are also oriented so as to correspond to the taper angle of rollers 40. Surfaces 22a, 22b, 32a and 32b provide smooth, hard surfaces or raceways for rollers 40. As a result, the cup 20 can slidably rotate with respect to the inner ring 30 or vise versa.

In the embodiment shown herein, inner ring 30 is a three-piece assembly which includes first and second cone portions 34a and 34b, separated by spacer ring 36. Alternatively, the inner ring 30 can be fabricated as a single unitary piece. Inner ring 30 also includes thrust ribs 38 which are dimensioned and configured so as to maintain the axial position of rollers 40. More specifically, ends 42 (see FIG. 2) of rollers 40 are adjacent to and abut against the thrust ribs 38, and therefore thrust ribs 38 prevent the rollers 40 from being dislodged from the raceways when the bearing component 10 is subjected to radial loads.

As noted above, bearing seal assembly 100 also includes axially opposed first and second interlocking seal assemblies 50a and 50b, each being positioned at an end of bearing component 10 so as to exclude contaminants from entering chamber 25 and maintain the lubricant therein. Seal assemblies 50a and 50b include a radially outer shield ring 60 and a radially inner shield ring 70. The outer shield 60 is engaged with counterbore 24 (see FIG. 2) formed in the cup 20 and the inner shield ring 70 is positioned around the journal 82 of axle 80. Seal assemblies 50a and 50b will be described in more detail herein below with respect to FIG. 2.

With continuing reference to FIG. 1, unitized bearing seal assembly 100 is positioned over axle 80 so as to facilitate the rotational movement of axle 80 with respect to housing 90 or vise versa. The inner diameter of inner ring 30 of bearing component 10 is dimensioned such that it fits around journal 82 of axle 80. The bearing component 10 is received within recess 92 formed in housing 90 and permits the axle 80 to rotate with respect to housing 90, about an axis 95 of rotation. Bearing component 10 is clamped on the journal 82 between a backing ring 94 and an end cap 96, the latter being urged toward the former by cap screws 98 which thread into the end of the journal 82. Neither the backing ring 94 nor the end cap 96 bear directly against bearing component 10, but instead they exert a clamping force through spacer rings 14a and 14b that likewise encircle the journal 82.

In the operation of bearing seal assembly 100, the two rows of tapered rollers 40 allow the axle 80 and inner ring 30 to rotate with respect to the housing 90 and cup 20 or vise versa. Additionally, the outer shield ring 60 of the seal assemblies 50a and 50b is fixed with respect to cup 20 and rotates relative to axle 80 and inner shield ring 70. A lubricant, such as grease, is provided in chamber 25 to reduce the rolling friction and thereby facilitate the rotational movement of the axle 80 with respect to the housing 90 or vise versa. During rotation, the tapered rollers 40 generate hydrodynamic forces that tend to pump the lubricant outwardly towards the thrust ribs 38.

Figure 2:
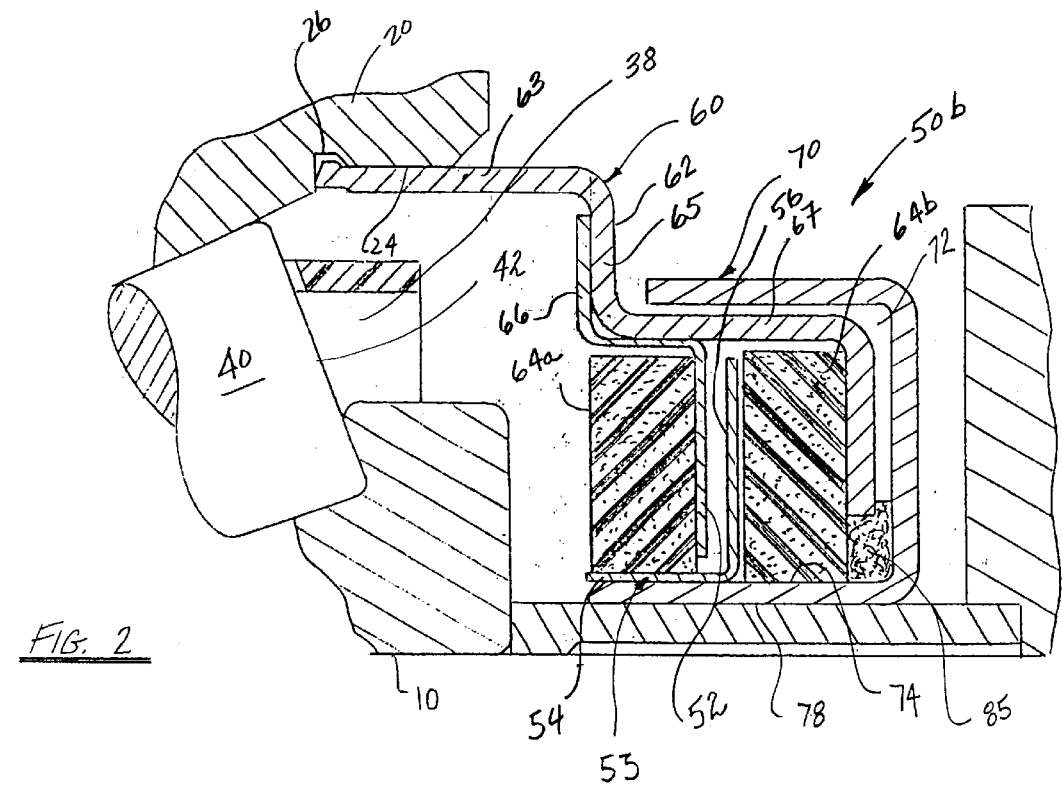
FIG. 2 illustrates an enlarged localized cross-sectional view of the unitized, interlocked seal of FIG. 1 which includes a radially outer casing that is engaged with the bearing cup member and a radially inner deflector ring installed over the axle or shaft.

Referring now to FIG. 2, there is illustrated an enlarged localized view of seal assembly 50b shown engaged with bearing component 10. As stated above, seal assembly 50b includes an outer shield ring 60 and an inner shield ring 70 which are interlocked so as to form a unitized seal. Both shield rings, 60 and 70, extend 360 degrees around axle 80. Outer shield ring 60 includes a rigid casing or case 62, first and second open-cell foam seal elements, 64a and 64b respectively, and a seal element retainer 66. Case 62 and inner shield ring 70 are manufactured preferably from steel using a metal stamping process or a similar metal forming technique. Case 62 includes, among other elements, a first axially extending portion 63, a second axially extending portion 67. The first axially extending portion 63 is positioned axially offset from and radially outward of the second axially extending portion 67 and the case 62 further includes a radially extending shoulder portion 65 which connects the first axially extending portion 63 to the second axially extending portion 67.

First axially extending portion 63 is adapted and configured for engagement with couterbore 24 of cup 20. More specifically, in the embodiment shown herein, counterbore 24 includes a recess 26 which receives a protuberance associated with the first axially extending portion 63 of case 62 and fixes the axial position of the casing 60. Shoulder portion 65 provides a flat surface perpendicular to axis 95 (see FIG. 1) which facilitates the installation and engagement of the case 62 with the counterbore 24 and therefore, the installation of the seal assembly 50b.

Radially inner shield ring 70 has an inner surface 78 which is adapted and configured for support by axle 80 and spacer ring 14b. The inner shield ring 70 is shaped so as to define an interior sealing channel 72 having a sealing surface 74.

Seal element retainer 66 is engaged with second axially extending portion 67 of case 62 by means of a press fit, although other methods of engagement are envisioned. In the embodiment shown herein, seal element retainer 66 is configured as a first baffle ring having an arm portion 52 that depends radially inward into the sealing channel 72. The first foam seal element 64a is fixably attached to the arm portion 52 of seal element retainer 66 and depends radially inward into the sealing channel 72.

With continuing reference to FIG. 2, seal assembly 50b further includes a second baffle ring 53 which has a shoulder portion 54 and an arm portion 56. The shoulder portion 54 of the second baffle ring 53 is engaged by a press fit with the inner shield ring 70. Arm portion 56 depends from the shoulder portion 54 so as to extend radially outward into the sealing channel 72. Second foam seal element 64b is disposed between the arm portion 56 of the second baffle ring 53 and the outer shield ring 70 and is presently preferably fiaxably attached directly to the outer shield ring 70. Foam seal elements, 64a and 64b, and the first and second baffle rings, 66 and 53, together define circuitous labyrinth pathway within the sealing channel 72 through which external contaminants must pass to enter bearing chamber 25.

First and second foam seal elements, 64a and 64b, are formed from an open-cell foam, such as polyurethane. However, other resins such as polysulfone and polyethylene may be used provided they have the appropriate chemical and thermal resistance. It is presently preferred that the first foam seal element 64a has a pore size within the range of about 15 to 25 pores per inch, preferably 20 pores per inch, and the second foam seal 64b has a pore size within the range of about 40 to 50 pores per inch, preferably 45 pores per inch.

The open-cell foam sealing elements, 64a and 64b, function to create a positive sealing barrier. Additionally, viscous lubricant, contained within sealing chamber 25 and the circuitous labyrinth, migrates into the open pores of these sealing elements to further enhance their sealing capabilities. More specifically, as the foam pores fill with grease, a very low friction contact is created between the inner shield ring sealing surface 74, second baffle ring 53, and first and second foam seal elements 64a and 64b. Moreover, a continuously filled grease barrier is created which provides a self-lubricating contact seal, and minimizes the friction and torque normally generated by the contact between seal elements and the sealing surface. Still further, the foam sealing elements, 64a and 64b, due to their porosity assist in ventilating the sealing system by allowing hot air and gas to migrate between bearing chamber 25 and the environment while blocking contaminant particles and water.

Seal assembly 50b further includes a highly viscous fluid 85 disposed within the circuitous sealing labyrinth. The highly viscous fluid 85 is presently preferably a water insoluble grease. The grease within the labyrinth aids in the retention of the lubricant within interior chamber 25 and the exclusion of contaminant therefrom. As a result, bearing seal assembly 100 is ventilated and requires less torque to rotate than conventional radial lip seals. This is due to the light, self-lubricating contact seals and the low shear strength of the grease.

Figure 3:
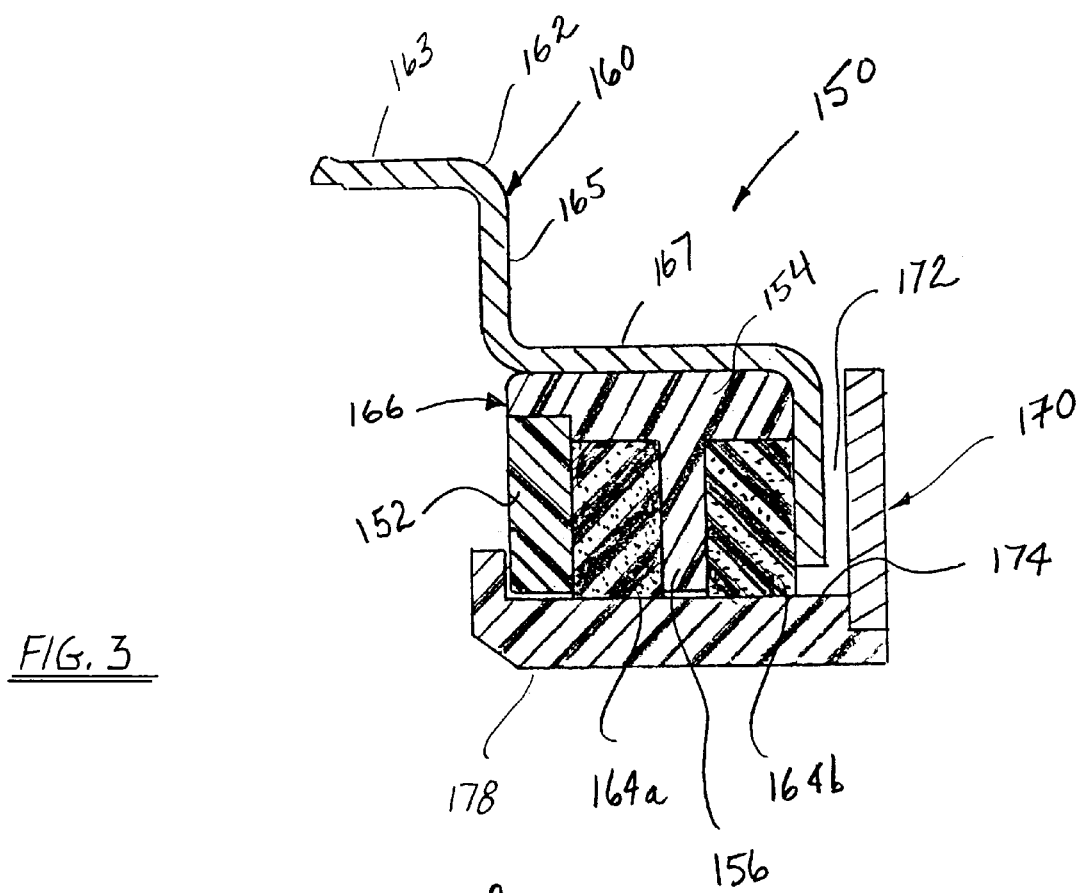
FIG. 3 is a cross-sectional view of another embodiment of the unitized seal assembly of the present disclosure, wherein first and second foam seal elements are supported within the sealing cavity by a two-piece plastic retainer.

Referring now to FIG. 3, which illustrates a unitized seal assembly constructed in accordance with a second embodiment of the subject disclosure and designated by reference numeral 150. Unitized seal assembly 150 is similar in structure and function to seal assembly 50b. More particularly, seal assembly 150 functions to seal a bearing chamber defined between outer and inner bearing cylinders (not shown).

Similar to the seal assembly 50b of FIG. 2, seal assembly 150 includes a radially outer shield ring 160 and a radially inner shield ring 170 which are interlocked so as to form a unitized seal. Both shield rings, 160 and 170, extend 360° around the axle. Outer shield ring 160 includes a rigid casing or case 162, first and second open-cell foam seal elements, 164a and 164b respectively, and a seal element retainer 166. Case 162 is manufactured preferably from steel using a metal stamping process or a similar metal forming technique. As before in the previous embdiment, case 162 includes a first axially extending portion 163 and a second axially extending portion 167. The first axially extending portion 163 is positioned axially offset from and radially outward of the second axially extending portion 167 and the case 162 further includes a radially extending shoulder portion 165 which connects the first axially extending portion 163 to the second axially extending portion 167.

The radially inner shield ring 170 has an inner surface 178 which is adapted and configured for support by the axle and a spacer ring. The inner shield ring 170 is shaped so as to define an interior sealing channel 172 having a sealing surface 174. Unlike, inner shield ring 70, which was preferably made of steel and formed by metal stamping, inner shield ring 170 is a two-part assembly which is made from a plastic. The two-part construction aids in the installation of seal assembly 150. Subsequent to the installation process, the two parts can be joined by adhesion, ultrasonic welding or any other suitable joining technique.

With continuing reference to FIG. 3, seal element retainer 166 is engaged with second axially extending portion 167 of case 162 by means of a press fit, although other methods of engagement are envisioned. Unlike seal element retainer 66 of FIG. 2, seal element retainer 166 is a two-piece assembly which is presently preferably constructed from a plastic, such as PTFE. Seal element retainer 166 includes a body portion 154 and an end ring 152. The body portion 154 and the end ring 152 can be joined by any acceptable technique, such as adhesion or ultrasonic welding. The body portion 154 of seal element retainer 166 includes a separator arm 156 which maintains a spacing between the first and second foam seals, 164a and 164b respectively. First foam seal element 164a is disposed in the void defined between the end ring 152 and the separator arm 156. Although not required, it is presently preferred that first foam seal element 164a is attached or adhered to seal element retainer 166. Second foam seal element 164b is disposed in the cavity defined between separator arm 156 and inner shield ring 170.

Foam seal elements, 164a and 164b, and in conjunction with case 162 and inner shield ring 170, define a circuitous labyrinth pathway through which external contaminants must pass to enter bearing chamber 25. Similar to seal assembly 50b, seal assembly 150 can include a highly viscous fluid disposed within the labyrinth, is ventilated and requires less torque to rotate than conventional radial lip seals, due to the light, self-lubricating contact seals and the low shear strength of the grease.

Figure 4:
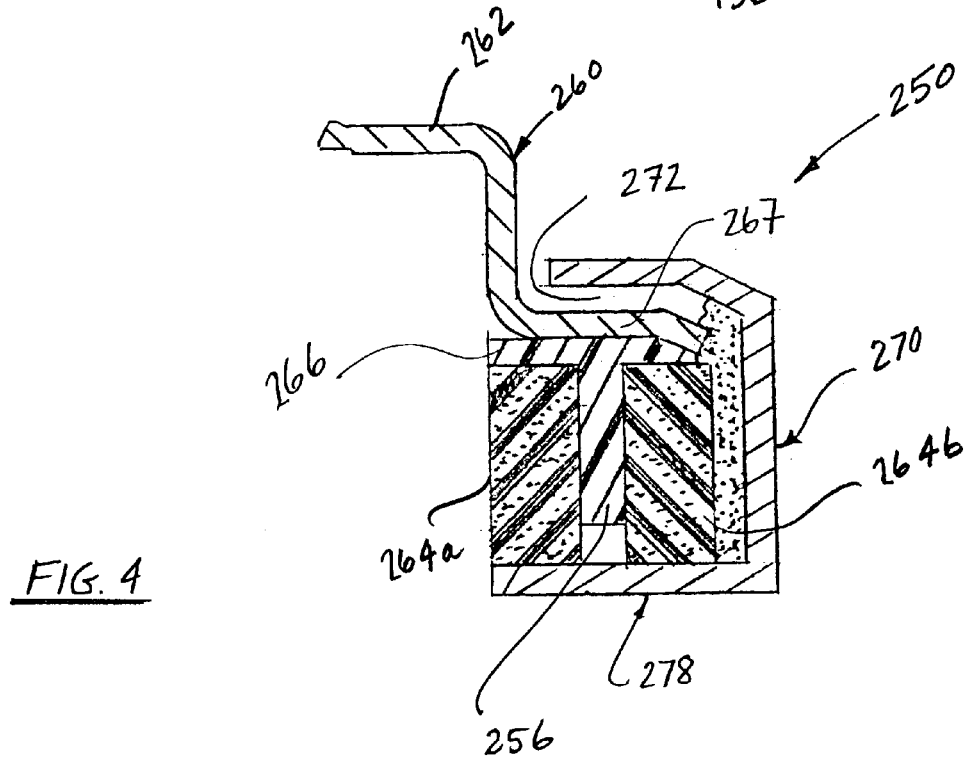
FIG. 4 is a cross-sectional view of another embodiment of the unitized seal assembly of the present disclosure, wherein first and second foam elements are supported within the sealing cavity by a one-piece plastic retainer.

Referring now to FIG. 4, there is illustrated a seal assembly 250 which is similar in structure and function to seal assemblies 50a, 50b and 150. Seal assembly 250 is adapted and configured to seal a bearing chamber defined between outer and inner bearing cylinders (not shown). Structural elements of seal assembly 250 which are similar to and correspond to those already described for seal assembly 50b have been identified with similar reference numerals.

Similar to the seal assembly 50b of FIG. 2, seal assembly 250 includes a radially outer shield ring 260 and a radially inner shield ring 270. Outer shield ring 260 includes a rigid casing or case 262, first and second open-cell foam seal elements, 264a and 264b respectively, and a seal element retainer 266. Radially inner shield ring 270 has an inner surface 278 which is adapted and configured for support by the axle and/or a spacer ring. The inner shield ring 270 is shaped so as to define an interior sealing channel 272 having a sealing surface 274.

Seal element retainer 266 is engaged with the second axially extending portion 267 of the case 262 by means of a press fit, although other methods of engagement are envisioned. In the embodiment disclosed herein, seal element retainer 266 includes an arm portion 256 which retains foam seal elements 264a and 264b within the sealing channel 272.

Figure 5:
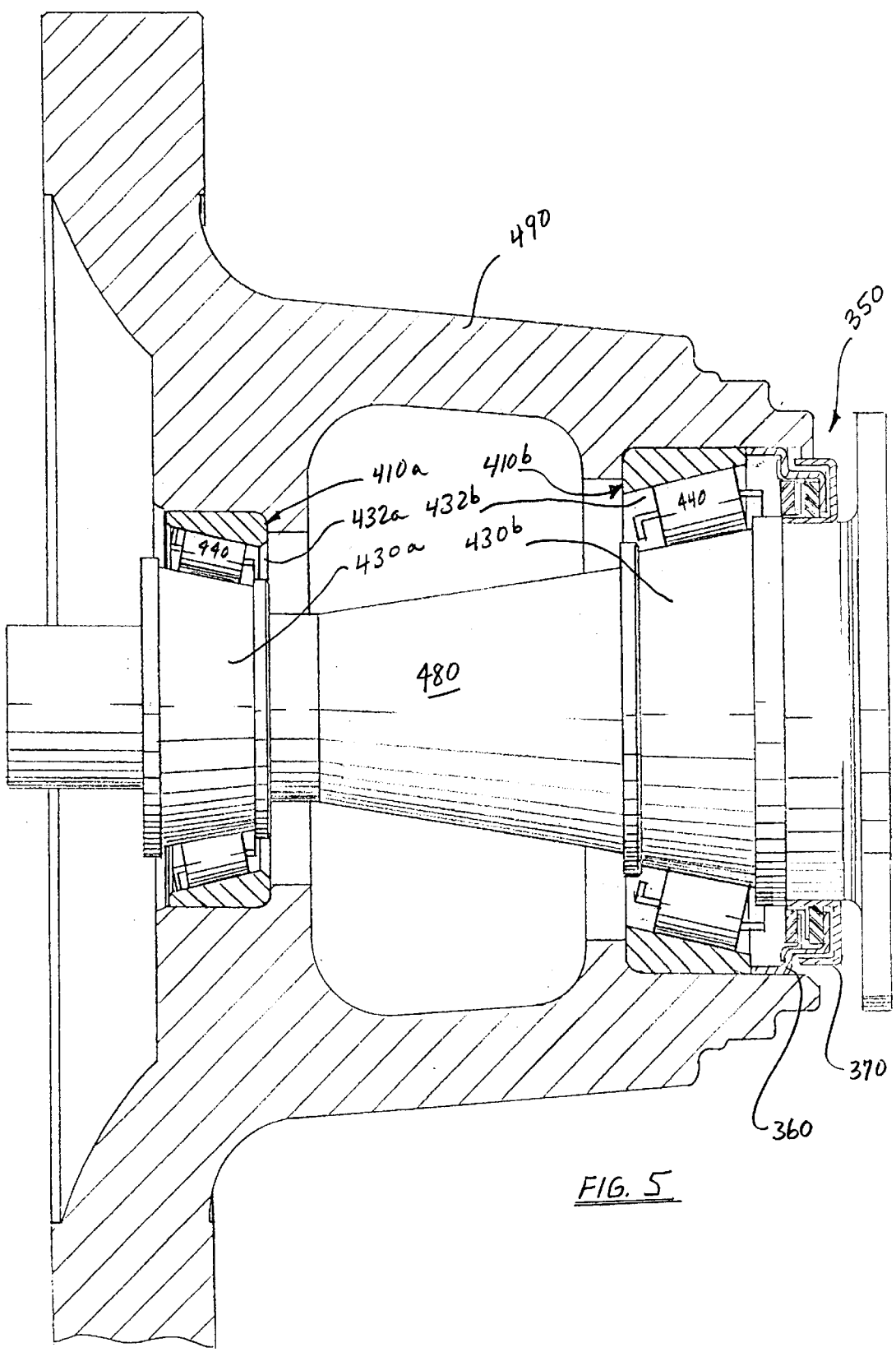
FIG. 5 is a cross-sectional view illustrating a seal assembly installed in a heavy truck application, the seal having a configuration similar to the seal assembly of FIGS. 1 and 2.

Referring now to FIG. 5, there is illustrated the seal assembly 350 shown in an installed condition in a representative trucking application. In this trucking application, a hub member 490 is mounted for relative rotation on axle 480. Axle 480 includes outboard and inboard bearing journals, 430a and 430b, respectively. Bearing components 410a and 410b are disposed within interior chambers 432a and 432b which are defined between hub 490 and journals 430a and 430b. Bearing components 410a and 410b include a plurality of tapered roller bearings 440 and allow hub 490 to rotate relative to stationary axle 480.

Seal assembly 350 is similar in structure and function to seal assembly 50b, and includes an outer casing or shield ring 360 and an inner deflector or shield ring 370 which are interlocked so as to form a unitized seal. Both the outer shield ring 360 and the inner shield ring 370 extend 360 degrees around axle 480. Outer shield ring 360 includes a rigid case and a shield element. Shield ring 360 is adapted and configured for engagement with hub 490 so as to rotate therewith. In the embodiment shown herein, shield ring 360 is press-fit into a counterbore formed in hub 490. Similar to seal assembly 50b, a light contacting, self-lubricating seal is formed on the outboard end of the bearing assembly. Those skilled in the art will readily appreciate that other techniques for engaging the shield ring 360 with hub 490 can be utilized or that the shield ring 360 can be engaged with a cup member which is part of bearing component 410b.

For each of the previously described embodiments of the invention, preferred materials of manufacture were disclosed for the sealing elements and the shield rings. Also the circuitous labyrinth was described as being filled with a lubricant, preferably water insoluble grease. It is envisioned however that a magnetic seal can be used in lieu of the foam sealing elements. The magnetic seal can include foam sealing components which include conventional magnets. Additionally, the labyrinth defined between the elements can be filled with a ferrofluid. A ferrofluid is a stable colloidal suspension of sub-domain magnetic particles in a liquid carrier. The particles, which have an average size of about 100 Å (10 nm), are coated with a stabilizing dispersing agent (surfactant) which prevents particle agglomeration even when a strong magnetic field gradient is applied to the ferrofluid. The surfactant must be matched to the carrier type and must overcome the attractive van der Waals and magnetic forces between the particles.

In the absence of a magnetic field, the magnetic moments of the particles are randomly distributed and the fluid has no net magnetization. When a magnetic field is applied to a ferrofluid, the magnetic moments of the particles orient along the field lines almost instantly. The magnetization of the ferrofluid responds immediately to the changes in the applied magnetic field and when the applied field is removed, the moments randomize quickly. In a gradient field, the whole fluid responds as a homogeneous magnetic liquid which moves to the region of highest flux. This means that ferrofluids can be precisely positioned and controlled by an external magnetic field. The forces holding the magnetic fluid in place are proportional to the gradient of the external field and the magnetization value of the fluid. This means that the retention force of a ferrofluid can be adjusted by changing either the magnetization of the fluid or the magnetic field in the region.

The selection of ferrofluid depends on many factors such as environments, operating life, etc. The operating life of the seal depends on the volatility of the ferrofluid. Seals that require long life must use ferrofluids with low evaporation rate or vapor pressure. Also, seals operating at high vacuum must incorporate low vapor pressure fluids. The lower the volatility, the higher the viscosity of the ferrofluid. U.S. Pat. No. 5,013,471 to Ogawa discloses a method for producing a ferrofluid suitable for use with the subject seal assembly.

It is envisioned that the ferrofluid is secured in the labyrinth defined between the magnetic sealing elements by the magnetic force or flux. The ferrofluid establishes an airtight seal which prevents contaminants in the form of particles or gas from entering the bearing chamber, while minimizing frictional forces during the rotation.

While the unitized seal assembly of the present disclosure has been described with respect to preferred embodiments, those skilled in the art will readily appreciate that various changes and/or modifications can be made to the invention without departing from the spirit or scope of the invention as defined by the appended claims.

What is claimed is:

1. A labyrinth seal assembly for sealing an annular gap defined between a bore of a housing and an outer surface of a cylindrical shaft, wherein the housing and shaft are relatively movable, the seal assembly comprising:

a) a radially inner shield ring having an inner surface adapted and configured for support by the shaft, the inner shield ring defining a sealing channel which includes at least one sealing surface; and b) a radially outer shield ring partially disposed within the sealing channel of the inner shield ring, the outer shield ring including a casing member, first and second foam seal elements, and means for retaining the first foam seal element within the sealing channel, the casing member including opposed first and second axially extending portions, the first axially extending portion adapted and configured for engagement with the housing, the seal element retaining means engaged with the second axially extending portion of the casing member and having the first foam seal element depending radially inward into the sealing channel so as to form a circuitous sealing labyrinth therein, and wherein the first and second foam seal elements comprise differing material densities.

2. A seal assembly as recited in claim 1, further comprising a highly viscous fluid disposed within the circuitous sealing labyrinth.

3. A seal assembly as recited in claim 2, wherein the highly viscous fluid comprises a water insoluble grease.

4. A seal assembly as recited in claim 2, wherein the highly viscous fluid is a ferrofluid.

5. A seal assembly as recited in claim 4, wherein the at least one of the first or second foam seal elements includes a conventional magnet or electromagnet.

6. A seal assembly as recited in claim 1, wherein the first foam seal element has a pore size of 20 pores per inch and the second foam seal has a pore size of 45 pores per inch.

7. A seal assembly as recited in claim 1, wherein at least one of the first or second foam seal elements is formed from polyurethane.

8. A seal assembly as recited in claim 1, wherein the seal element retaining means is engaged with the second axially extending portion by means of a press fit.

9. A seal assembly as recited in claim 1, wherein the means for retaining the first seal element within the sealing channel is formed from a plastic material and the at least one foam sealing element is adhered thereto.

10. A seal assembly as recited in claim 1, wherein the means for retaining the first seal element within the sealing channel includes a first baffle ring having an arm portion which depends radially inward into the sealing channel.

11. A seal assembly as recited in claim 1, further comprising a second baffle ring having a shoulder portion and an arm portion, the shoulder portion being engaged with the inner shield ring and the arm portion depending from the shoulder portion so as to extend radially outward into the sealing channel.

12. A seal assembly as recited in claim 1, wherein the first axially extending portion is positioned axially offset from and radially outward of the second axially extending portion and the casing member further includes a radially extending shoulder portion which connects the first axially extending portion to the second axially extending portion.

13. A bearing assembly for placement between a bore of a housing and an outer surface of an elongated axle, the bearing assembly comprising:
   a) an outer cylinder having axially opposed first and second ends, the outer cylinder defining a first race surface on an inner diameter thereof and a central axis for the bearing assembly;
   b) an inner cylinder coaxially positioned within the outer cylinder and defining a second race surface on an outer diameter thereof, wherein a bearing chamber is defined between the outer cylinder and the inner cylinder;
   c) a plurality of bearings disposed within the bearing chamber and in rolling contact with the first and the second race surfaces, each bearing facilitating relative rotational movement between the inner cylinder and the outer cylinder; and
   d) a labyrinth seal assembly associated with the first end of the outer cylinder and for sealing the bearing chamber defined between the outer cylinder and the inner cylinder, the seal assembly including:
      i) a radially inner shield ring having an inner surface adapted and configured for support by the axle, the inner shield ring defining a sealing channel which includes at least one sealing surface; and
      ii) a radially outer shield ring partially disposed within the sealing channel of the inner shield ring, the outer shield ring including a casing member, first and second foam seal elements, and means for retaining the first foam seal element within the sealing channel, the casing member including opposed first and second axially extending portions, the first axially extending portion adapted and configured for engagement with the first end of the outer cylinder, the seal element retaining means being engaged with the second axially extending portion of the casing member and having the first foam seal element depending radially inward into the sealing channel so as to form a circuitous sealing labyrinth therein, and wherein the first and second foam seal elements comprise differing material densities.

14. A bearing assembly as recited in claim 13, further comprising a highly viscous fluid disposed within the circuitous sealing labyrinth.

15. A bearing assembly as recited in claim 14, wherein the highly viscous fluid comprises a water insoluble grease.

16. A bearing assembly as recited in claim 14, wherein the highly viscous fluid is a ferrofluid.

17. A bearing assembly as recited in claim 16, wherein at least one of the first or second foam seal elements includes a conventional magnet or electromagnet.

18. A bearing assembly as recited in claim 13, wherein the first foam seal element has a pore size of 20 pores per inch and the second foam seal has a pore size of 45 pores per inch.

19. A bearing assembly as recited in claim 13, wherein at least one of the first or second foam seal elements is formed from polyurethane.

20. A bearing assembly as recited in claim 13, wherein the means for retaining the first seal element within the sealing channel is engaged with the second axially extending portion by means of a press fit.

21. A bearing assembly as recited in claim 13, wherein the means for retaining the first seal element within the sealing channel is formed from a plastic material and the at least one foam sealing element is adhered thereto.

22. A bearing assembly as recited in claim 13, wherein the means for retaining the seal element within the sealing channel includes a first baffle ring having an arm portion which depends radially inward into the sealing channel.

23. A bearing assembly as recited in claim 13, further comprising a second baffle ring having a shoulder portion and an arm portion, the shoulder portion being engaged with the inner shield ring and the arm portion depending from the shoulder portion so as to extend radially outward into the sealing channel.

24. A bearing assembly as recited in claim 21, wherein the first axially extending portion is positioned axially offset and radially outward of the second axially extending portion and the casing member further includes a radially extending shoulder portion which connects the first axially extending portion to the second axially extending portion.

25. A labyrinth seal assembly for sealing an annular gap defined between a bore of a housing and an outer surface of an elongated axle, wherein relative rotational movement exists between the axle and the housing, the seal assembly comprising:
   a) a radially inner shield ring having an inner surface adapted am configured for support by the axle, the inner shield ring defining a sealing channel which includes at least one sealing surface; and
   b) a radially outer shield ring which includes:
      i) a casing member having axially opposed first and second end portions, the first end portion adapted and configured for engagement with the bore of the housing and the second end portion partially disposed with the sealing channel so as to form a first section of a circuitous sealing labyrinth;
      ii) a first baffle ring having a shoulder portion and an arm portion, the shoulder portion engaged with the second end portion of the casing member, the arm portion depending radially inward from the shoulder portion into the sealing channel; and
      iii) first and second foam seal elements disposed within the sealing channel so as to form a second portion of the circuitous sealing labyrinth, the first foam seal element being engaged with the first baffle ring and the second foam seal element being affixed to the second end portion of the casing member, wherein the first foam seal element has a material density which is greater than a material density for the second foam seal.

26. A seal assembly as recited in claim 25, further comprising a highly viscous fluid disposed within the circuitous sealing labyrinth.

27. A seal assembly as recited in claim 26, wherein the highly viscous fluid comprises a water insoluble grease.

28. A seal assembly as recited in claim 26, wherein the highly viscous fluid is a ferrofluid.

29. A seal assembly as recited in claim 28, wherein the first and second foam seal elements include a conventional magnet or electromagnet.

30. A seal assembly as recited in claim 25, wherein the first foam seal element has a pore size of 20 pores per inch and the second foam seal has a pore size of 45 pores per inch.

31. A seal assembly as recited in claim 25, wherein at least one of the first or second foam seal elements is formed from polyurethane.

32. A seal assembly as recited in claim 25, wherein the first baffle ring is engaged with the second axially extending portion by means of a press fit.

33. A seal assembly as recited in claim 25, wherein the first baffle ring is formed from a plastic material.

34. A seal assembly as recited in claim 25, further comprising a second baffle ring having a shoulder portion and an arm portion, the shoulder portion being engaged with the inner shield ring and the arm portion depending from the shoulder portion so as to extend radially outward into the sealing channel.

35. A seal assembly as recited in claim 25, wherein the first axially extending portion is positioned axially offset and radially outward of the second axially extending portion and the casing member further includes a radially extending shoulder portion which connects the first axially extending portion to the second axially extending portion.

* * * * *

UNITED STATES PATENT AND TRADEMARK OFFICE
CERTIFICATE OF CORRECTION

PATENT NO. : 6,722,657 B2
DATED : April 20, 2004
INVENTOR(S) : Charles Robin Hood et al.

It is certified that error appears in the above-identified patent and that said Letters Patent is hereby corrected as shown below:

Column 12,
Line 49, "adapted am configured for support by the axle, the inner," should read
-- adapted and configured for support by the axle, the inner --.

Signed and Sealed this

Thirteenth Day of July, 2004

JON W. DUDAS
*Acting Director of the United States Patent and Trademark Office*